(12) United States Patent
Morrison et al.

(10) Patent No.: US 7,148,284 B2
(45) Date of Patent: Dec. 12, 2006

(54) HOT MELT ADHESIVE

(75) Inventors: Brian D. Morrison, Lebanaon, NJ (US); Jagruti B. Patel, Branchburg, NJ (US); Justin A. Mehaffy, Hampton, NJ (US)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 0 days.

(21) Appl. No.: 10/851,584

(22) Filed: May 21, 2004

(65) Prior Publication Data
US 2005/0261416 A1    Nov. 24, 2005

(51) Int. Cl.
C08L 91/06    (2006.01)
C09J 191/06    (2006.01)

(52) U.S. Cl. ...................................... 524/487
(58) Field of Classification Search ................ 524/487
See application file for complete search history.

(56) References Cited

U.S. PATENT DOCUMENTS

| 4,060,569 | A | * | 11/1977 | Woods et al. ................ 568/959 |
| 4,081,415 | A | * | 3/1978 | Matubara et al. ............ 524/488 |
| 4,146,521 | A | * | 3/1979 | Godfrey ..................... 524/499 |
| 4,345,349 | A | * | 8/1982 | Flanagan ....................... 412/5 |
| 4,816,306 | A | * | 3/1989 | Brady et al. ............. 428/36.92 |
| 5,220,388 | A | | 6/1993 | Kato |
| 5,414,039 | A | * | 5/1995 | Watson et al. ............... 524/502 |
| 5,604,268 | A | * | 2/1997 | Randen et al. .............. 523/164 |
| 5,827,913 | A | * | 10/1998 | Baetzold et al. ............. 523/210 |
| 5,900,465 | A | * | 5/1999 | Nishikawa et al. ........... 525/98 |
| 6,107,430 | A | * | 8/2000 | Dubois et al. ............ 526/348.5 |
| 6,221,448 | B1 | * | 4/2001 | Baetzold et al. ........... 428/35.2 |
| 6,329,468 | B1 | * | 12/2001 | Wang ......................... 525/240 |
| 6,552,110 | B1 | * | 4/2003 | Yalvac et al. ............... 524/274 |
| 2003/0106189 | A1 | | 6/2003 | Okawa et al. |
| 2003/0195272 | A1 | | 10/2003 | Harwell et al. |
| 2005/0003197 | A1 | | 1/2005 | Good et al. |
| 2006/0014901 | A1 | * | 1/2006 | Hassan et al. ............... 525/191 |

* cited by examiner

Primary Examiner—Peter Szekely
(74) Attorney, Agent, or Firm—Cynthia L. Foulke

(57) ABSTRACT

Hot melt adhesives that contain an N-alpha olefin wax have substantially improved open times.

11 Claims, 1 Drawing Sheet

HOT MELT ADHESIVE

FIELD OF THE INVENTION

Figure 1A:
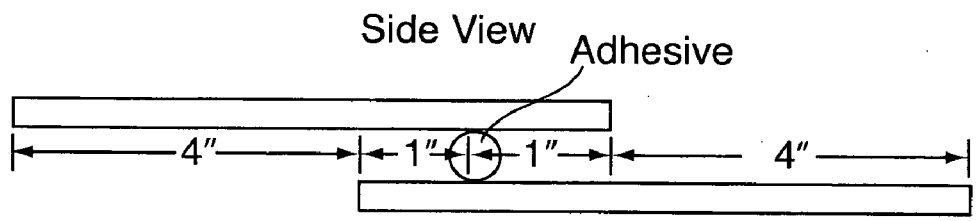

The invention relates to hot melt adhesives. The adhesives of the invention have long open times and excellent cold adhesion, as well as good heat resistance.

BACKGROUND OF THE INVENTION

Hot melt adhesives are applied to a substrate when molten, then placed in contact with a second substrate at which point the adhesive is cooled to harden the adhesive layer and form a bond. Hot melts are widely used for industrial adhesion applications, and are extensively used in product assembly and in packaging applications such as case sealing and carton closing operations.

Commercially available adhesives have until recently been applied at temperatures of 350° F. (177° C.) or greater in order to ensure complete melting of all the components and to achieve a satisfactory application viscosity. The need for such elevated temperatures increases operator risks with respect both to burns and to inhalation of residual volatiles and requires more energy, placing greater demands on the manufacturing facility.

Recent developments have led to hot melt adhesives that can be applied at lower temperatures, i.e., lower than 300° F. and down to about 200° F. One drawback, however, of low application temperature hot melt adhesives is their short open time, which makes their use impractical for packaging operations requiring hot melt adhesives with long open times to accommodate slower sealing applications.

There continues to be a need for improved hot melt adhesives, including adhesives having extended open times. The current invention fulfills this need.

SUMMARY OF THE INVENTION

The invention provides hot melt adhesives, including hot melt adhesives that can be applied at temperatures of less than 350° F., in particular temperatures of about 300° F. or less, preferably temperatures of down to about 200° F. or lower, and which have longer open times than low application temperature hot melt adhesives heretofore known in the art.

The invention provides a hot melt adhesive comprising an adhesive polymer and an N-alpha-olefin wax. Adhesives comprising an ethylene copolymer and an N-alpha olefin wax are preferred. Ethylene vinyl acetate, ethylene n-butyl acrylate or mixtures thereof are preferred copolymers for use in the practice of the invention.

The invention also provides a method of sealing and/or making or forming a case, a carton, a tray, a box or a bag. The method comprises using a hot melt adhesive containing an N-alpha-olefin wax. In preferred embodiments, the adhesive is applied at temperatures of less than about 350° F., preferably at temperatures of about 300° F. or less, and down to about 200° F. or lower.

The invention further provides articles of manufacture comprising a hot melt adhesive containing an N-alpha-olefin wax. Preferred articles include cartons, cases, trays, bags and like packaging articles used for packaging products that are formed and/or sealed using a hot melt adhesive. The packaging article may comprise cardboard or paperboard that has been adhered by such hot melt adhesives. If desired the adhesive may be pre-applied to the article, e.g., carton, case, tray or bag during the manufacture thereof, and reactivated prior to packaging of a product. Other articles include, but are not limited to, casemaking and nonwoven (e.g., diapers) applications and the like.

The invention still further provides packaged articles contained within a carton, case, tray or bag, such as a packaged food, wherein the carton, case, tray or bag comprises a hot melt adhesive an N-alpha-olefin wax.

Another aspect of the invention is directed to a process for bonding a first substrate to a similar or dissimilar second substrate using the hot melt adhesives of the invention. The process comprises applying to at least a first substrate a molten hot melt adhesive composition, bringing a second substrate in contact with the adhesive present on the first substrate, and allowing the adhesive to solidify whereby the first substrate is bonded to the second substrate. In one embodiment, the molten adhesive is applied (i.e., pre-applied) to the first substrate and allowed to solidify. The adhesive is then reactivated, either before or following, the step of bringing the second substrate in contact with the adhesive present on the first substrate. The substrates to be bonded together may be the same or different (i.e., dissimilar). In one preferred embodiment, the substrates to be bonded together are cellulosic substrates.

DETAILED DESCRIPTION OF THE INVENTION

All documents cited herein are incorporated in their entireties by reference.

Hot melt adhesives that are able to achieve longer open times in conjunction with application at low temperatures have been discovered. The adhesives of the invention comprise a normal (N) alpha olefin wax.

Open time is used herein to refer to the "working time" of an adhesive, which begins at the point when an adhesive is applied to a first substrate until it is bonded to a second substrate. It is critical that the adhesive present on the first substrate be joined to the second substrate during this time. If the open time is exceeded before the first substrate is joined to the second substrate, the adhesive will lose its ability to bond the second substrate.

The adhesives of the invention may advantageously be applied at low temperatures. In addition to longer open time, the adhesives of the invention exhibit an excellent balance of adhesive properties when exposed to heat and cold. The adhesives of the invention possess excellent heat resistance and cold resistance.

Low application temperature means that the adhesive can be applied at temperatures below about less than 350° F., in particular temperatures of about 300° F. or less, preferably temperatures of down to about 200° F. or lower.

High heat resistance means the ability to maintain good bond integrity at elevated temperatures.

Cold resistance is the ability to maintain a high strength bond when exposed to cold temperatures.

The adhesives of the invention will typically comprise an adhesive polymer, an N-alpha-olefin wax and a tackifying resin.

The adhesive of the invention may be used in automated assembly applications, such as but not limited to carton, case or tray formation where the adhesive is applied from large bulk industrial melting systems where assemblies' speeds can reach hundreds of units per minute. Due to the long open time they are ideally suited for applications requiring longer times between the application of the adhesive to the substrate and subsequent closing and sealing thereof.

Adhesive Composition

Adhesives encompassed by the invention comprise an adhesive polymer and an N-alpha olefin wax. A description of adhesives components that can be formulated in accordance with the invention and examples of formulations of the invention follow. It is, however, recognized that the skilled artisan can formulate these and other components in various amounts and test such formulations for the performance properties described and taught herein in order to prepare other formulations encompassed by the invention.

i. Polymer Component

Any base polymer suitable for use in formulating hot melt adhesives, as are well known to those skilled in the art may be used in the practice of the invention. The adhesives of the invention will preferably comprise at least one ethylene polymer, and may comprise a blend of two or more polymers. The term ethylene polymer, as used herein, refers to homopolymers, copolymers and terpolymers of ethylene. Preferred are copolymers of ethylene with one or more polar monomers, such as vinyl acetate or other vinyl esters of monocarboxylic acids, or acrylic or methacrylic acid or their esters with methanol, ethanol or other alcohols. Included are ethylene vinyl acetate, ethylene methyl acrylate, ethylene n-butyl acrylate, ethylene acrylic acid, ethylene methacrylate, ethylene 2-ethylhexylacrylate, ethylene octene and mixtures and blends thereof. Mixtures of ethylene n-butyl acrylate and ethylene vinyl acetate are particularly preferred.

Other polymers that find utility in this invention include homopolymers or copolymers of propylene, octene, hexene, heptene, butene, and ethylene monomers.

Particularly preferred adhesives comprise an ethylene n-butyl acrylate copolymer containing up to about 45% by weight, typically 15 to 35% of n-butyl acrylate and has a melt index of at least about 300. Ethylene n-butyl acrylate copolymers are available from Elf Atochem North America, Philadelphia, Pa. under the tradename Lotryl®, from Exxon Chemical Co. under the tradename Enable® (e.g., EN33330 which has a melt index of about 330 grams/10 minutes and an n-butyl acrylate content of about 33% by weight in the copolymer and EN33900 which has a melt index of about 900 and an n-butyl acrylate content of about 35% by weight) and from Millennium Petrochemicals under the tradename Enathene® (e.g., EA 89822 which has a melt index of about 400 grams/10 minutes and a n-butyl acrylate content of about 35% by weight in the copolymer).

Ethylene vinyl acetate polymers that may be used in the practice of the invention will generally have a MI of at least about 300 grams/10 minutes and having a vinyl acetate content of from about 10 to about 45% by weight, as well as blends thereof. Ethylene vinyl acetate copolymers are available from DuPont Chemical Co., Wilmington, Del. under the tradename Elvax® (e.g., Elvax® 205 W, which has a melt index of 800 and a vinyl acetate content of about 28% by weight in the copolymer). Other ethylene vinyl acetate copolymers are available from Exxon Chemical Co. under the tradename Escorene® (e.g., UL 7505) and also from Millennium Petrochemicals, Rolling Meadows, Ill., under the tradename Ultrathene® (e.g., UE 64904) and AT® copolymers available from AT Polymers & Film Co., Charlotte, N.C. (e.g., AT® 1850M) and Evatane® from Atofina Chemicals, Philadelphia, Pa.

The polymer component will usually be present in an amount of from about 10 wt % to about 60 wt %, more preferably from about 20 wt % to about 40 wt %, even more preferably from about 25 wt % to about 35 wt %.

ii. Tackifying Component

The adhesive compositions of this invention are preferably tackified. The tackifier component will usually be present in an amount of from about 10 wt % to about 60 wt %, more preferably from about 25 wt % to about 45 wt %, even more preferably from about 30 wt % to about 40 wt %. The tackifying resins typically will have Ring and Ball softening points, as determined by ASTM method E28-58T, between about 70° C. and 150° C., more preferably between about 90° C. and 120° C., and most preferably between about 95° C. and 110° C. Mixtures of two or more of the below described tackifying resins may be required for some formulations.

Useful tackifying resins may include any compatible resin or mixtures thereof such as natural and modified rosins including, for example, as gum rosin, wood rosin, tall oil rosin, distilled rosin, hydrogenated rosin, dimerized rosin, resinates, and polymerized rosin; glycerol and pentaerythritol esters of natural and modified rosins, including, for example as the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin; copolymers and terpolymers of natured terpenes, including, for example, styrene/terpene and alpha methyl styrene/terpene; polyterpene resins having a softening point, as determined by ASTM method E28-58T, of from about 70° C. to 150° C.; phenolic modified terpene resins and hydrogenated derivatives thereof including, for example, the resin product resulting from the condensation, in an acidic medium, of a bicyclic terpene and a phenol; aliphatic petroleum hydrocarbon resins having a Ball and Ring softening point of from about 70° C. to 135° C.; aromatic petroleum hydrocarbon resins and the hydrogenated derivatives thereof; and alicyclic petroleum hydrocarbon resins and the hydrogenated derivatives thereof. Also included are the cyclic or acyclic $C_5$ resins and aromatic modified acyclic or cyclic resins. Examples of commercially available rosins and rosin derivatives that could be used to practice the invention include SYLVALITE RE 100L, SYLVARES RE 115, and SYLVARES RE 104 available from Arizona Chemical; Dertocal 140 from DRT; Limed Rosin No. 1, GB-120, and Pencel C from Arakawa Chemical.

Preferred tackifiers are synthetic hydrocarbon resins. Non-limiting examples include aliphatic olefin derived resins such as those available from Goodyear under the Wingtack® tradename and the Escorez® 1300 series from Exxon. A common $C_5$ tackifying resin in this class is a diene-olefin copolymer of piperylene and 2-methyl-2-butene having a softening point of about 95° C. This resin is available commercially under the tradename Wingtack 95. Most preferable are aromatic hydrocarbon resins that are $C_9$ aromatic/aliphatic olefin-derived and available from Startomer and Cray Valley under the trade name Norsolene and from Rutgers series of TK aromatic hydrocarbon resins. Norsolene M1090 is a low molecular weight thermoplastic hydrocarbon polymer derived largely from alpha-pinene which has a ring and ball softening point of 95–105° C. and is commercially available from Cray Valley. These $C_9$ based hydrocarbon resins are particularly useful when synthesized with an alpha-pinene, styrene, terpene, alpha-methylstyrene, and/or vinyl toluene, and polymers, copolymers and terpolymers thereof, terpenes, terpene phenolics, modified terpenes, and combinations thereof. The increased aromatic structure of these resins produces more polar character in the resins that contributes toward the desired compatibility and performance of the adhesives of this invention.

iii. Wax Component

The wax component will typically be present in the formulations of the invention in amounts of from about 5 to about 60 wt %, more preferable from 10 to 45 wt %, and even more preferable from 25 to 40 wt %, based on the weight of the total formulation. At least about 1 wt % and up to about 30 wt %, more typically from about 3 to about 10 wt %, of the total formulation are N-alpha-olefin waxes. Waxes having a melting point, as determined by the Mettler drop point test ASTM D-127, of less than about 175° F. are preferred. The N-alpha olefins of the wax component will preferable have a melting point of from about 120° F. to about 175° F.

N-alpha-olefin waxes are commercially available from Chevron Phillips Chemical Company. Commercially available grades of N-alpha olefin waxes are available, such as $C_{20-24}$, $C_{26-28}$, $C_{30+}$, and may be used in the hot melt adhesives of the invention.

iv. Other Optional and/or Desirable Components

Adhesives of the invention may optionally and preferably also comprise other components including but not limited to functional additives. Functional additives are defined herein as being components that add a specific physical or chemical property that impact the characteristics in manufacturing or use, not related to the adhesion character, which are easier to incorporate or retain in low temperature adhesives. Such functional additives may exert an effect on the environment. Examples of such functional components include biocides, therma-chromic materials (e.g., as tamper evidence or temperature sensor), anti-counterfeit tags, fragrances, freshness enhancers (e.g., $O_2$ scavengers, anti-bacterials, pest repellent, spoilage detection, low temperature encapsulants (e.g., thermoplastic micro-spheres that would not be stable at temperatures above 250° F.) and the like.

Other compounds could be added that also do not affect physical properties are pigments which add color, or fluorescing agents, to mention only a couple. Additives like these are known to those skilled in the art. Depending on the contemplated end uses of the adhesives, other additives such as plasticizers, pigments and dyestuffs conventionally added to hot melt adhesives might be included. In addition, small amounts of additional tackifiers and/or waxes such as microcrystalline waxes, paraffin waxes, polyethylene waxes, polypropylene waxes, by-product polyethylene waxes, Fischer-Tropsch waxes, hydrogenated castor oil and vinyl acetate modified synthetic waxes may also be incorporated in minor amounts, i.e., up to about 10 percent by weight, into the formulations of the present invention.

The adhesives of the present invention will preferably contain a stabilizer or antioxidant. These compounds are added to protect the adhesive from degradation caused by reaction with oxygen induced by such things as heat, light, or residual catalyst from the raw materials such as the tackifying resin.

Among the applicable stabilizers or antioxidants included herein are high molecular weight hindered phenols and multifunctional phenols such as sulfur and phosphorous-containing phenol. Hindered phenols are well known to those skilled in the art and may be characterized as phenolic compounds which also contain sterically bulky radicals in close proximity to the phenolic hydroxyl group thereof. In particular, tertiary butyl groups generally are substituted onto the benzene ring in at least one of the ortho positions relative to the phenolic hydroxyl group. The presence of these sterically bulky substituted radicals in the vicinity of the hydroxyl group serves to retard its stretching frequency, and correspondingly, its reactivity; this hindrance thus providing the phenolic compound with its stabilizing properties. Representative hindered phenols include; 1,3,5-trimethyl-2,4,6-tris-(3,5-di-tert-butyl-4-hydroxybenzyl)-benzene; pentaerythrityl tetrakis-3(3,5-di-tert-butyl-4-hydroxyphenyl)-propionate; n-octadecyl-3(3,5-di-tert-butyl-4-hydroxyphenyl)-propionate; 4,4'-methylenebis (2,6-tert-butyl-phenol); 4,4'-thiobis (6-tert-butyl-o-cresol); 2,6-di-tertbutylphenol; 6-(4-hydroxyphenoxy)-2,4-bis(n-octyl-thio)-1,3,5 triazine; di-n-octylthio)ethyl 3,5-di-tert-butyl-4-hydroxy-benzoate; and sorbitol hexa[3-(3,5-di-tert-butyl-4-hydroxy-phenyl)-propionate].

Utilizing, in conjunction therewith, known synergists such as, for example, thiodipropionate esters and phosphites may further enhance the performance of these antioxidants. Distearylthiodipropionate is particularly useful. These stabilizers, if used, are generally present in amounts of about 0.1 to 1.5 weight percent, preferably 0.25 to 1.0 weight percent.

Such antioxidants are commercially available from Ciba-Geigy, Hawthorne, N.Y. and include Irganox® 565, 1010 and 1076 which are hindered phenols. These are primary antioxidants that act as radical scavengers and may be used alone or in combination with other antioxidants such as phosphite antioxidants like Irgafos® 168 available from Ciba-Geigy. Phosphite catalysts are considered secondary catalysts and are not generally used alone. These are primarily used as peroxide decomposers. Other available catalysts are Cyanox® LTDP available from Cytec Industries in Stamford, Conn., and Ethanox® 1330 available from Albemarle Corp. in Baton Rouge, La. Many such antioxidants are available either to be used alone or in combination with other such antioxidants. These compounds are added to the hot melts in small amounts and have no effect on other physical properties.

v. Components for Reactivation of Pre-applied Adhesive

The adhesives of the invention may be pre-applied to a substrate and later reactivated. Since reactivation can be accomplished at lower temperatures for adhesives of this invention, less energy is required in the reactivation process independent of the reactivation method utilized. The ability to reactivate using less energy enables these adhesives to be run at faster production speeds or require less room for reactivation on a production line.

In one embodiment of the invention, adhesive is preapplied to a substrate, allowed to solidify and then, later, reactivated using, e.g., conventional heat seal applications. In a preferred embodiment, the adhesive of the invention is formulated for purpose of pre-application/reactivation. Preferred re-activatable adhesives for pre-application to a substrate comprises an energy-absorbing ingredient. Pigments and dyes are particularly preferred energy absorbing ingredients, near infrared absorbing dyes and pigments being particularly preferred.

Energy absorbing ingredients for use in the practice of the invention will typically have an absorption in the range of from about 400nm to about 1000,000 nM, more preferably from about 700 nm to about 10,000 nm, even more preferably from about 750 nm to about 5000 nm. Energy-absorbing ingredients include those dyes, pigments, fillers, polymers and resins or other ingredients that are capable of absorbing energy and that provide an optimal balance of absorption, reflection, transmission and conduction. Pigments and dyes are particularly preferred energy absorbing ingredients, with near infrared absorbing dyes and pigments being particularly preferred.

Preferred energy-absorbing ingredients for use in the practice of the invention are broad band near IR absorbers such as Epolight 1125 (Epolene, Inc), SDA6248 (H.W. Sands Corp.), SDA2072 (H.W. Sands Corp.) and carbon black. Carbon black can be purchased from Cabot under trade name of Monarch, Regal, Black Pearl, and Elftex, or Degussa (FW series), or from Columbian Chemical Company (Raven Series). Carbon black can be manufactured by different methods such as the furnace black method, the gas (channel) black method, and the lamp black method. The key parameters affecting the radian energy absorption of carbon black prepared by these various methods are average primary particle size, surface chemistry and aggregate structure. The adhesives of the invention reactivate on exposure to short durations of radiant energy providing superior on-line performance and set speed that allows for quicker production speeds.

Ways of reactivating adhesives of the invention include, but are not limited to heat, hot air, steam, ultrasonic, e-beam, radio frequency, and microwave.

vi. Fragrancing

Due to the low application temperature, effective perfuming of the hot melts of the invention is possible. The fragranced material is added to the hot melt adhesives of the invention and is capable of remaining stable in the adhesives prior to and after use without significant loss of fragrance. The term effective perfuming means the fragrance remains stable during production of the adhesive, during storage of the adhesive prior to use and is still available for delivery after the adhesive has been used. By delivery means the scent evolves from the adhesive into the environment proximate to the adhesive. By stable is meant that the fragrance remains noticeable following manufacture of the adhesive, following storage of the adhesive, following manufacture of an article formed using the adhesive, during storage of the manufactured article and during use of the manufactured article by the end user. The terms fragranced and scented are used in their ordinary sense to refer to and include any fragrant substance or mixture of substances including natural (i.e., obtained by extraction of flower, herb, blossom or plant), artificial (i.e., mixture of natural oils or oil constituents) and synthetically produced substance and odoriferous compounds.

In most cases fragrance compositions are formulated to have a fragrance generally considered at least inoffensive and preferably pleasing to intended users of the composition or user of the article prepared with the adhesive. Fragrance compositions may also be used for imparting a desired odor to the skin and/or any product for which an agreeable odor is indispensable or desirable. Fragrance compositions are also used in products that would normally have an unattractive or offensive odor to mask the odor and produce an odor that is less unattractive or offensive. The (pleasing) fragrance characteristics may be the main function of the product in which the fragrance composition has been incorporated or may be ancillary to the main function of the product.

Fragrances that can be added to the hot melt adhesive of the invention are preferably selected to have a closed cup flash point of greater than 100° F., preferably greater than about 200° F. Fragrant materials, including modifications and compositions thereof, e.g., a modified essential oil composition, may be tested for closed cup flash point determined in accordance with ASTM method D93-00 (Flash Point by Pensky-Martens Closed Cup Tester).

Use and Utility

The adhesive compositions of the present invention are prepared by blending the components in the melt at a temperature of above about 90° C., typically at about 110° C., until a homogeneous blend is obtained, usually about two hours is sufficient. Various methods of blending are known in the art and any method that produces a homogeneous blend is satisfactory.

The hot melt adhesives of the invention find use in, for example, packaging, converting, bookbinding, bag/sack endings, cigarette manufacturing and in the non-wovens markets. The adhesives find particular use as case, carton, and tray forming, and as sealing adhesives, including heat sealing applications. Encompassed by the invention are containers, e.g., cartons, cases, boxes, bags, trays and the like.

Hot melt adhesives for packaging are generally extruded in bead form onto a substrate using piston pump or gear pump extrusion equipment. Hot melt application equipment is available from several suppliers including Nordson, ITW and Slautterback. Wheel applicators are also commonly used for applying hot melt adhesives, but are used less frequently than extrusion equipment. Alternatively the adhesive may be applied by the packaging converter prior to shipment to the packager, i.e., the container comprises a pre-applied adhesive. Following the packaging of the container, the container may be heat sealed by conventional means or subjected to any alternative source of energy that heats the adhesive to proper bonding temperatures. The low temperature adhesives of this invention are particularly suitable for these applications because they require less energy to reactive or reheat to the proper temperatures for bond formation. In preferred embodiments, the adhesive to be pre-applied comprises an energy absorbing ingredient.

Substrates to be bonded include virgin and recycled kraft, high and low density kraft, chipboard and various types of treated and coated kraft and chipboard. Composite materials are also used for packaging applications such as for the packaging of alcoholic beverages. These composite materials may include chipboard laminated to an aluminum foil that is further laminated to film materials such as polyethylene, Mylar, polypropylene, polyvinylidene chloride, ethylene vinyl acetate and various other types of films. Additionally, these film materials also may be bonded directly to chipboard or Kraft. The aforementioned substrates by no means represent an exhaustive list, as a tremendous variety of substrates, especially composite materials, find utility in the packaging industry.

EXAMPLES

In the following examples, which are provided for illustrative purposes only, all parts are by weight and all temperatures in degrees Fahrenheit unless otherwise noted. Adhesive samples were prepared in a single blade mixer and heated until components yielded a homogeneous mixture.

Adhesion

Adhesion at various temperatures, as noted in Table 2, was determined by applying a one-eighth to one-quarter inch wide bead of adhesive widthwise at 200° F. (93° C.) to a 2 inch by 3 inch piece of substrate and immediately bringing a second piece of board into contact. A 200 gram weight was immediately placed on the construction. The boardstock was 275 pound burst strength corrugated board. The bonded specimens were kept at room temperature (73° F.), 40° F., 20° F. or 0° F. for 24 hours. The bonds were separated by hand and a determination made as to extent of fiber tear.

Heat Stress

The heat resistance of a bond was determined as described below and with reference to FIGS. 1A and 1B. In summary, the temperature of failure for a stressed bond is determined by bonding two corrugated substrates together, stressing the bond with a three hundred gram weight then placing in an oven for 24 hours, after which the bond is examined to see if it is still intact.

The corrugated substrates used are double fluted. Referring to FIG. 1A, an adhesive bead is applied to the substrate such that the flutes run in a direction perpendicular to the direction of the adhesive bead. The adhesive bead is positioned one inch from the front edge of the bottom substrate and five inches from the front edge of the top substrate. Bead width on the substrate is eight hundredths of an inch wide prior to compression of the adhesive bead between the top and bottom substrate with a two hundred gram weight.

Figure 1B:
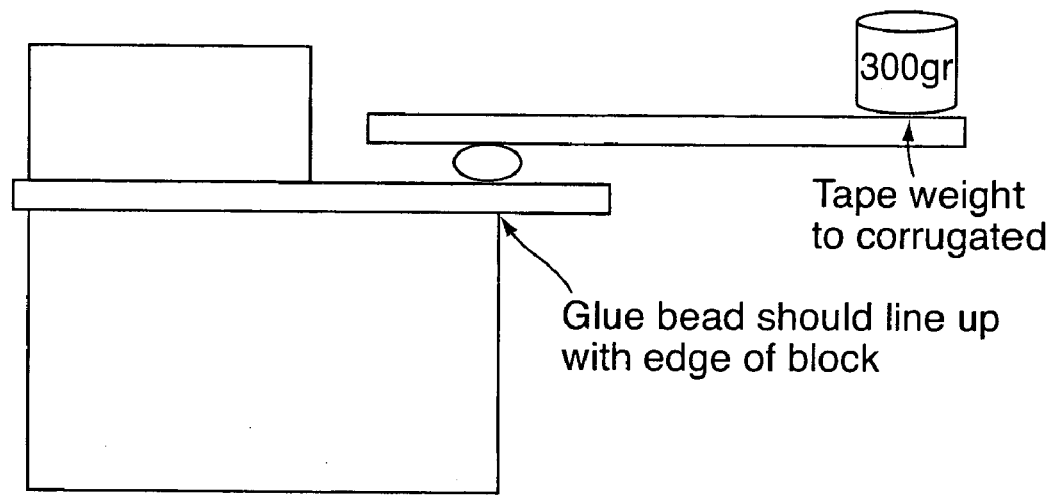

As shown in FIG. 1B, a three hundred gram weight is fixed to the front edge of the top substrate. A brace is then used to create a fulcrum point directly under the adhesive bead. The braced bond with weight is then place in an oven set at 100° F. below the application temperature of the adhesive. The bond is left in the oven for twenty-four hours and then examined to determine if the bond is still intact. A bond that remains intact is recorded as a passing result for the temperature of the test. For bonds that pass this test, new adhesive bonds are prepared and subjected to higher temperatures. This procedure is repeated at still higher temperatures until bond failure is observed. The highest temperature that a bond passes is recorded as the heat resistance of that adhesive.

Open time

Open time was measured using an automated bond making/testing instrument.

Open time and Compression time were programmed into the auto timers of the instrument.

Top and bottom pieces of substrate were loaded into the bond tester.

The adhesive bead was controlled for application temperature, bead width and coat weight via a heated glue tank, pump pressure and conveyor line speed.

When activated, the instrument conveyor moves the bottom piece of substrate under a stream of adhesive. Once the glue bead is applied to the bottom substrate the open time timer begins. It then travels beneath a second (top) piece of substrate. Here it waits until the programmed open time is reached (usually in seconds).

Once the open time is reached, the top piece of substrate lowers onto the bottom piece of substrate until contact is made. Here it compresses the bead of adhesive for a programmed amount of time (compression time, usually in seconds).

Once the compression time has elapsed, the top piece of substrate separates from the bottom piece of substrate breaking the bond. The operator then records the amount of fiber tear generated by the bond separation. Fiber tear is the amount of substrate fibers that remains on the compressed bead surface after separation. It is recorded as the percent of the overall compressed bead surface. If the fiber tear amount is equal to or greater than 75% then the fiber tear is considered to be Full.

If the fiber tear amount is 50 to 74% then the fiber tear is considered to be Partial/Full.

If the fiber tear amount is 25 to 49% then the fiber tear is considered to be Partial.

Less than 25% fiber tear then the fiber tear is considered to be Slight.

These steps are repeated using longer and longer open times until the fiber tear produced, is less than 75%.

In the following examples, the open time of the adhesive was determined as the time (usually in seconds) when full fiber tear (75–100%) disappears and as the time when there is no fiber tear.

Example 1

An adhesive of the invention was compared to prior art hot melt technology. Adhesives having the formulations shown in Table I were prepared and tested for open time and fiber tear. Adhesive was applied to the substrate at 250° F. and compressed for 25 seconds before the substrates were pulled apart.

TABLE 1

| Raw materials | Sample 1 | Sample 2 | Sample 3 | Sample 4 |
|---|---|---|---|---|
| Paraffin wax (120° F.) | 30 | | 30 | |
| N-alpha olefin wax (120° F.) | | 30 | | 30 |
| EnBA | | | 35 | 35 |
| EVA | 35 | 35 | | |
| Terpene phenolic tackifier | 35 | 35 | | |
| Rosin ester tackifier | | | 35 | 35 |
| Open time (sec) | | | | |
| Time to less than 100% fiber tear | 8.5 | 11 | 8.5 | 8.5 |
| Time to no fiber tear | 15 | 17 | 11.5 | 14 |

The results show that adhesives comprising N-alpha olefin wax has longer open time than 120° F. paraffin wax in both EVA and EnBA based adhesive systems.

Example 2

Adhesive samples having the formulations shown in Table 2 were prepared. Adhesive was applied to the substrate at 200° F. and compressed for 10 seconds before the substrates were pulled apart.

TABLE 2

| Raw materials (wt %) | Sample A | Sample B |
|---|---|---|
| Paraffin wax (150° F.) | 25 | 25 |
| N-alpha olefin wax (120° F.) | 0 | 10 |
| Paraffin wax (120° F.) | 10 | 0 |
| EnBA | 20 | 20 |
| EVA | 10 | 10 |
| Hydrocarbon tackifier | 25 | 25 |
| Rosin ester tackifier | 10 | 10 |
| Viscosity @ 200° F. | 1212 cps | 1212 cps |
| Adhesion (% fiber tear) | | |
| Room temperature | 100, 90 | 95/100 |
| 40° F. | 90, 100 | 100, 100 |
| 20° F. | 90, 95 | 90, 95 |
| 0° F. | 95, 60 | 90, 100 |
| Heat stress | | |
| Fail | 100° F. | |
| Split | | 100° F. |
| Open time (sec) | | |
| Time to less than 100% Fiber tear | 4 | 5 |
| Time to no fiber tear | 6.0–6.5 | 8.0–8.5 |

Results show that N-alpha-olefins when used in a wax blend extends open time.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

The invention claimed is:

1. A hot melt adhesive comprising an ethylene vinyl acetate copolymer or an ethylene n-butyl acrylate copolymer, an N-alpha olefin wax and a tackifier, said wax having a melting point of from about 120° F. to about 175° F.

2. The adhesive of claim 1 comprising at least one other wax component.

3. The adhesive of claim 1 comprising from about 1 wt % to about 35 wt % of said N-alpha olefin wax.

4. The adhesive of claim 1 comprising a near infra-red energy absorbing ingredient.

5. The adhesive of claim 4 wherein the near infra-red absorbing ingredient is an organic dye or a pigment.

6. The adhesive of claim 1 comprising a fragrance.

7. The adhesive of claim 1 which has a melting point of about 120° F.

8. The adhesive of claim 1 wherein the N-alpha olefin wax is a $C_{20-24}$, $C_{26-28}$, or $C_{30+}$ N-alpha olefin wax.

9. The adhesive of claim 1 which is applied at a temperature of less that 350° F.

10. The adhesive of claim 9 which is applied at a temperature of less than 300° F.

11. The adhesive of claim 10 which is applied at a temperature down to about 200° F.

* * * * *